3,184,336
METHOD OF CLEANING AQUEOUS SYSTEMS
John Phillip Murphy, 346 Morning View Ave.,
Akron 5, Ohio
No Drawing. Filed Apr. 15, 1963, Ser. No. 272,874
6 Claims. (Cl. 134—22)

This invention relates to a method of maintaining, cleaning, and preventing the deposit of mud in water pipes and accompanying systems carrying raw water. More specifically, this invention is directed to a method of clarifying raw water, as it passes through the systems to prevent the mud from accumulating on the inner surfaces. The deposit of mud, scum and the like frequently interferes with the normal operation of these systems and various means of preventing these accumulations have been proposed.

Presently, millions of gallons of raw water are being taken from rivers, lakes, ponds etc. and being used for various industrial purposes. In some cases, the volume of raw water used in a single industry has increased in the last twenty years from about 35 to 150 million gallons per day. The problem of mud deposits is particularly critical in industrial cooling systems such as condensers, feed water heaters, coolers, slag quenching and the like. Here, raw water is used as the heat-exchange media, in large volumes, and the efficiency of these systems depends upon the adequate transfer of heat. In most cases the mud, if allowed to accumulate, will act as an insulator and thus decrease the efficiency of the equipment. It is possible that in time, with the continuous use of raw water, the pipes, tubes, pumps, water jackets etc. will become completely clogged and require expensive repairs.

Various methods of cleaning these systems have been attempted, most of which include mechanical scraping or chemical treatments. The latter, however, is the most practical and economical, and accordingly is the object of this invention.

It has been discovered, quite unexpectedly, that the problem of mud accumulation due to raw water can be avoided by treating the mud with a small, but effective amount of a high molecular weight water-soluble polymer of ethylene oxide. Not only is the polymer of this invention effective in preventing and removing deposits of mud, but also in preventing accumulations of algae and other slime which form organisms.

Presently, water is being treated and particularly waste waters from the paper, wood, steel and mining industries with inorganic chemicals and more recently with organic compounds and water-soluble polymers. These organic chemicals, however, are compounds which ionize in aqueous medias. They are referred to as either being anionic or cationic in that they have radicals which form ionizable groups that attract solids which have an opposite charge. Typical examples of these compounds include the amines, substituted ammonium salts, organic acids, salts, amides, esters and more recently water-soluble polymers having ionizable or electrolytic groups. The latter are characterized by having a number of recurring ionizable groups and for this reason are particularly useful in the mining industry or in the treatment of boiler-water where inorganic salts e.g. calcium carbonate are to be removed.

Likewise, surfactants including the anionics, cationics and the non-ionics such as the phenyl or alcohol-epoxide compounds are used, generally, in aqueous dispersions because they contain both hydrophilic and hydrophobic groups which permit them to orient at air-water interface. These compounds are low molecular weight materials, however, and are useful as wetting or dispersing agents.

Unlike these materials, however, and contrary from what might be expected, the high molecular weight polymer of this invention was found to be very effective in preventing the accumulation of mud in water pipes and accompanying systems carrying raw or muddy water. It was discovered that when the mud was treated or reacted with the polymer of ethylene oxide, it was converted to a non-adhesive rubbery mass which enabled it to be removed with the water as it flowed through the systems.

Accordingly, it is an object of this invention to provide a method of treating mud to prevent it from depositing in aqueous systems by mixing with the water an effective amount of a high molecular weight polymer of ethylene oxide.

It is another object of this invention to provide a method of cleaning and preventing the accumulation of mud in aqueous pipe systems by treating the mud and systems with a small but effective amount of a water-soluble high molecular weight polymer of ethylene oxide.

It is still another object of this invention to provide a means of utilizing raw water for industrial purposes without the problem of having mud, normally found in the water, accumulate in the system.

It is still another object of this invention to provide a means of converting mud to a non-adhesive, stringy mass, which can be removed or carried with the water through the systems without adhering or accumulating.

It is still another object of this invention to provide a method of using large volumes of raw water in industrial pipe systems for various purposes without the problem of mud accumulations.

It is still a further object of this invention to provide a means of treating mud and slime found in raw water to prevent their accumulating in aqueous systems. The treatment comprising the addition of a polymer of ethylene oxide prior to or simultaneously with the water passing through the system.

These and other objects of this invention will become apparent from a further and more detailed description to follow.

It has been discovered, quite unexpectedly, that mud and related materials normally found in raw water, e.g. river water can be treated with a polymeric composition to convert it to an inactive non-adhesive mass which can be removed readily from the water. More specifically, it has been found that the mud treated in the manner described will permit the use of large volumes of raw water, continuously, for a variety of industrial purposes without regard to the problem of maintenance and repair normally due to mud accumulations. Normally, after using large volumes of raw water there is a considerable accumulation of mud which will have to be removed from the system. This can be avoided by treating the mud as the water flows through the system.

The amount of treatment, of course, will depend on the amount of mud present and the source of the raw water. Most raw water contains anywhere from as little as 25 to as much as 500,000 parts by weight of mud per million parts by weight of water and thus, the amount of polymer treatment will vary in this respect. However, for practical purposes, it has been found that most sources of water, as hereinabove described, can be treated for industrial use by converting the mud to a non-adhesive stringy mass by the addition of a small amount of the polymer. Thus enabling the treated mud to be removed with the water flowing through the system.

The amount of polymer to be added to the water will vary as indicated above, but normally will range from about 0.001 to about 2000 parts by weight of the ethylene oxide polymer per million parts by weight of the raw water. Preferably, however, the amount of polymeric ethylene oxide will range from about 0.05 to 500 parts by weight of the polymer per million parts by weight of the raw water.

The polymeric composition of this invention is essentially a water-soluble high molecular weight polymer of ethylene oxide; the average molecular weight of the polymer being in excess of 800,000 and preferably in excess of four million. Satisfactory results have been obtained, however, with polymers of ethylene oxide having an average molecular weight ranging from about 1 to 4 million, with the higher molecular weights being preferred.

This high molecular weight polymer is completely water-soluble at room temperature and can be used to prepare stock solutions which can be metered into the water, continuously, over a period of time. Aqueous solutions of this high molecular weight polymer e.g. molecular weight of four million in concentrations of about 1 and 2 percent, have viscosities ranging from about 2–4 thousand centipoises at 25° C. and 30–40 thousand centipoises at 25° C., respectively. The polymer is a white granular solid at room temperature having approximately 2 percent by weight of metal ash and less than 4 percent by weight of moisture.

The polymer is completely water-soluble and solutions of 5 percent or more can be prepared at room tempertaure or at temperatures up to about 170° F. The use of higher temperatures in preparing the original solutions should be avoided, as well as a high rate of shear. In mixing the solid polymer with the water, care should be taken to avoid vigorous agitation, since high shearing forces actually destroy or break the larger molecules.

It was unexpected to find that the polymer of ethylene oxide, when in contact with mud, converted it to a non-adhesive, ropy or stringy mass. The polymer of ethylene oxide, as distinguished from polyelectrolytic polymers, e.g. the acrylic, is not ionic in aqueous media. In other words, the polymer does not contain recurring units of one or more ionizable groups. Instead, it is characterized by the formula —$CH_2$—$CH_2$—O—$CH_2$—$CH_2$— or with recurring ether oxygens which are ordinarily non-reactive in an aqueous media. The mechanism by which the polymer reacts with the mud is not completely understood, but it is believed that the ether oxygen has unshared electrons which co-ordinate with electron acceptors i.e. of the mud forming a bond; thus, changing the characteristics of the mud.

Depending on the source of raw water and its ultimate use, it may be advisable in some instances to treat the mud in addition to the polymer, with small amounts of inorganic compounds. These include, for example, aluminum potassium sulfate, aluminum amonium sulfate, aluminum sulfate, ferric sulfate, ferric chloride, etc. These salts are used normally in amounts ranging up to about 3 percent by weight of the water, but can be increased as the solid content of mud in the water increases. It is important, however, when using these salts, e.g. aluminum sulfate, to have present also in the water sufficient amount of a base such as sodium or potassium hydroxide. The amount required is that amount needed to stoichiometrically convert the aluminum to the hydroxide. Usually the base will be present in amounts of approximately 60 percent or less by weight of the aluminum salt. Thus, for example, for every part by weight of the inorganic salt used, approximately 0.6 or less parts by weight of an alkali metal hydroxide is needed to convert the metal to its hydroxide.

The effectiveness of the ethylene oxide polymer to react with the mud and change its characteristics, is illustrated in the following examples.

*Table I*

| Polymeric ethylene oxide (molecular weight, 4 million), based on p.p.m. $H_2O$ | Lake Erie mud, 100 p.p.m. in $H_2O$ | |
|---|---|---|
| | Setting time, min:sec | Appearance of supernatant |
| 1 | 0.1 | 10:00 | Haze. |
| 2 | 0.5 | 10:00 | Do. |
| 3 | 1.0 | 5:00 | Do. |
| 4 | 2.0 | 3:25 | Sl. haze. |
| 5 | 3.0 | 2:30 | Clear. |
| 6 | 4.0 | 2:00 | Do. |
| 7 | 5.0 | 2:00 | Do. |
| 8 | 10.0 | 1:30 | Do. |
| 9 | 25.0 | 1:15 | Do. |
| 10 | 50.0 | 1:15 | Do. |
| 11 | 0 | 1 hr. | Muddy. |

*Table II*

| Polymeric ethylene oxide (molecular weight, 4 million), based on p.p.m. $H_2O$ | River mud, 1,000 p.p.m. in $H_2O$ | |
|---|---|---|
| | Setting time, min:sec | Appearance of supernatant |
| 1 | 1.0 | 6:00 | Sl. haze. |
| 2 | 3.0 | 3:00 | Clear. |
| 3 | 4.0 | 3:5 | Do. |
| 4 | 5.0 | 2:00 | Do. |
| 5 | 10.0 | 1:75 | Do. |
| 6 | 0 | 1 hr. | Muddy. |

*Table III*

| Polymeric ethylene oxide (molecular weight, 4 million), based on p.p.m. $H_2O$ | River mud, 2,500 p.p.m. in $H_2O$ | |
|---|---|---|
| | Setting time, min:sec | Appearance of supernatant |
| 1 | 1.0 | 10:00 | Haze. |
| 2 | 4.0 | 2:00 | Clear. |
| 3 | 5.0 | 3:00 | Do. |
| 4 | 0 | 1 hr. | Muddy. |

*Table IV*

| Polymeric ethylene oxide, based on p.p.m. $H_2O$ | Lake Erie mud, 5,000 p.p.m. in $H_2O$ | |
|---|---|---|
| | Setting time, min:sec | Appearance of supernatant |
| 1 | 2.0 | 1:5 | Sl. haze. |
| 2 | 3.0 | 1:25 | Do. |
| 3 | 4.0 | 3:35 | Clear. |
| 4 | 5.0 | 0:30 | Do. |
| 5 | 7.5 | 0:25 | Do. |
| 6 | 10 | 0:30 | Do. |
| 7 | 0 | 1 hr. | Muddy. |

*Table V*

| Polymeric ethylene oxide, based on p.p.m. $H_2O$ | River mud, 10,000 p.p.m. in $H_2O$ | |
|---|---|---|
| | Setting time, min:sec | Appearance of supernatant |
| 1 | 2.0 | 1:75 | Sl. haze. |
| 2 | 3.0 | 1:5 | Do. |
| 3 | 4.0 | 1:5 | Do. |
| 4 | 5.0 | 0:10 | Clear. |
| 5 | 10.0 | 0:15 | Do. |
| 6 | 25.0 | 0:10 | Do. |
| 7 | 50.0 | 0:10 | Do. |
| 8 | 0 | 1 hr. | Muddy. |

The data obtained from each of the above tables illustrates the effectiveness of the polymer to react with various concentrations of mud, e.g. up to 10,000 p.p.m. with various concentrations of polymer. The time in which the treatment took place ranged from a few seconds up to 10 minutes, depending upon the amount of mud and the amount of polymer needed to react with the mud.

The process of cleaning and preventing the deposit of mud in aqueous systems using muddy river water, was illustrated with a condenser having approximately 1000 square feet of cooling surface. In the operation of the condenser, the cooling water entered the system from a central pumping zone where approximately 5 parts per million of a water-soluble polymer of ethylene oxide, having an average molecular weight of about 4 million, was metered into the raw water, continuously, for about 14 days. After this time the pipes of the system were examined and found to be substantially clean and free from any deposits of mud. The treated mud was carried from the system with the flow of water. The condenser was then operated under the same conditions, except that the polymer addition was omitted, and it was found that after a period of about 7 days of using the same river water as the coolant, a substantial amount of mud had deposited in the system.

Other areas of pipe cleaning include, for example, irrigation lines where miles of pipe are used to carry water from river and ditches. The amount of mud that accumulates here in some cases steadily decreases the flow of water at a rate depending upon the amount of mud in the water. The addition of the polymer to the water which eventually ends in the soil is helpful as a soil conditioner.

While specific details have been disclosed, the invention is not limited thereto, as changes and alterations can be made without departing from the spirit thereof.

What is claimed is:

1. A method of cleaning and preventing the deposit and accumulation of mud in water pipes and accompanying water-systems carrying raw water containing mud which comprises treating the mud by adding to the raw water passing through the systems approximately 0.001 to 2000 parts by weight of a water-soluble, nonionic polymer of ethylene oxide per million parts by weight of the water; said water passing through said systems at a flow rate sufficient to carry the treated mud, and said polymer having an average molecular weight above 800,000.

2. The method of claim 1 further characterized in that the average molecular weight of the polymer ranges from about 800,000 to about 4 million.

3. The method of claim 2 further characterized in that the polymer of ethylene oxide is added to the raw water passing through the systems in an amount ranging from about 0.05 to 500 parts by weight per million parts by weight of the water.

4. The method of claim 2 further characterized in that the polymer of ethylene oxide is added to the raw water passing through the systems in an amount ranging from about 1.0 to 50 parts by weight per million parts by weight of the water.

5. The method of claim 2 further characterized in that the polymer of ethylene oxide is added to the raw water passing through the systems in an amount ranging from about 1 to 10 parts by weight per million parts by weight of the water and the average molecular weight of the polymer ranges from about 1 to 4 million.

6. The method of claim 2 further characterized in that in addition to the ethylene oxide polymer, an aluminum sulphate compound is added to the raw water in an amount ranging up to about 3% by weight of the water.

References Cited by the Examiner

UNITED STATES PATENTS

| 3,020,230 | 2/62 | Smith | 210—54 |
| 3,020,231 | 2/62 | Colwell et al. | 210—54 |
| 3,085,916 | 4/63 | Zimmie et al. | 134—22 |

OTHER REFERENCES

"Polyox," Ind. & Eng. Chem., vol. 50, No. 1, January 1958, pp. 5–16.

MORRIS O. WOLK, *Primary Examiner.*